United States Patent [19]

Horton

[11] 4,362,049
[45] Dec. 7, 1982

[54] METHOD AND APPARATUS FOR LEAK TESTING THE INTERIOR OF PIPE

[76] Inventor: Mark D. Horton, Apartment #1028 2401 West Belt, North, Houston, Tex. 77043

[21] Appl. No.: 194,386

[22] Filed: Oct. 6, 1980

[51] Int. Cl.³ .............................................. G01M 3/28
[52] U.S. Cl. ...................................... 73/49.6; 73/49.1
[58] Field of Search ....................... 73/49.5, 49.1, 49.6

[56] References Cited

U.S. PATENT DOCUMENTS

| | | | |
|---|---|---|---|
| 2,532,954 | 12/1950 | Sherer et al. | 73/49.6 X |
| 3,070,993 | 1/1963 | Rowell et al. | 73/49.5 |
| 3,566,675 | 3/1971 | Ledebur | 73/49.5 |
| 3,710,628 | 1/1973 | Horton | 73/49.5 |
| 3,877,293 | 4/1975 | McKeage | 73/49.1 |
| 4,182,160 | 1/1980 | Powers et al. | 73/49.5 |

FOREIGN PATENT DOCUMENTS

| | | | |
|---|---|---|---|
| 7609244 | 8/1976 | Netherlands | 73/49.1 |
| 662946 | 12/1951 | United Kingdom | 73/49.5 |

*Primary Examiner*—Edward R. Kazenske
*Assistant Examiner*—Joseph W. Roskos
*Attorney, Agent, or Firm*—Marcus L. Bates

[57] ABSTRACT

Method and apparatus for internally applying fluid pressure in order to determine the leak resisting characteristics of pipe, by gravitating a pipe into an elongated upwardly opening trough filled with a noncompressible fluid, such as water. The pipe is supported submerged within the trough and below the liquid level thereof such that opposed seals can be lowered into the trough, reciprocated towards one another and into engagement with the opposed ends of the filled pipe. Hence, the seals isolate the pipe interior after the pipe has been filled with the non-compressible fluid. The internal pressure of the pipe is increased and held for a finite period of time, thereby determining the rate at which the noncompressible fluid escapes from the pipe interior. The seals are released from the pipe ends, the fluid drained from the pipe and back into the trough, and the tested pipe is then removed from the apparatus.

11 Claims, 9 Drawing Figures

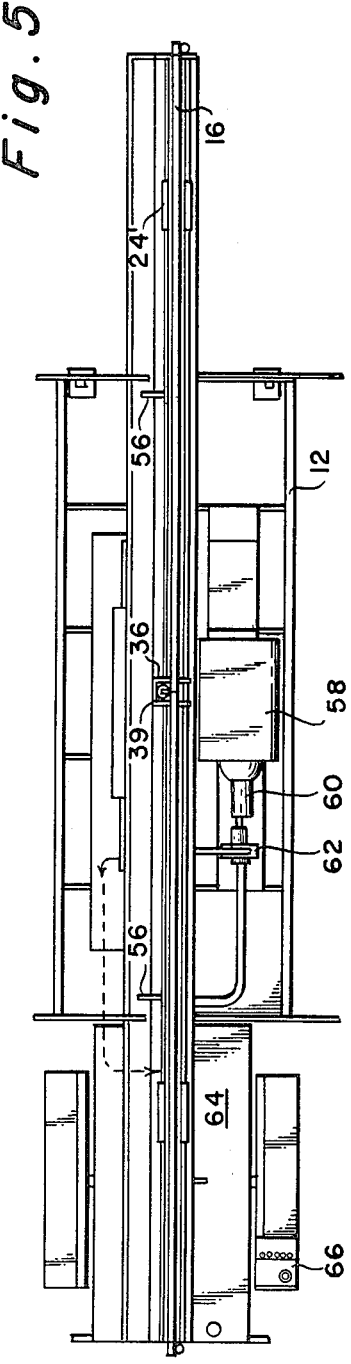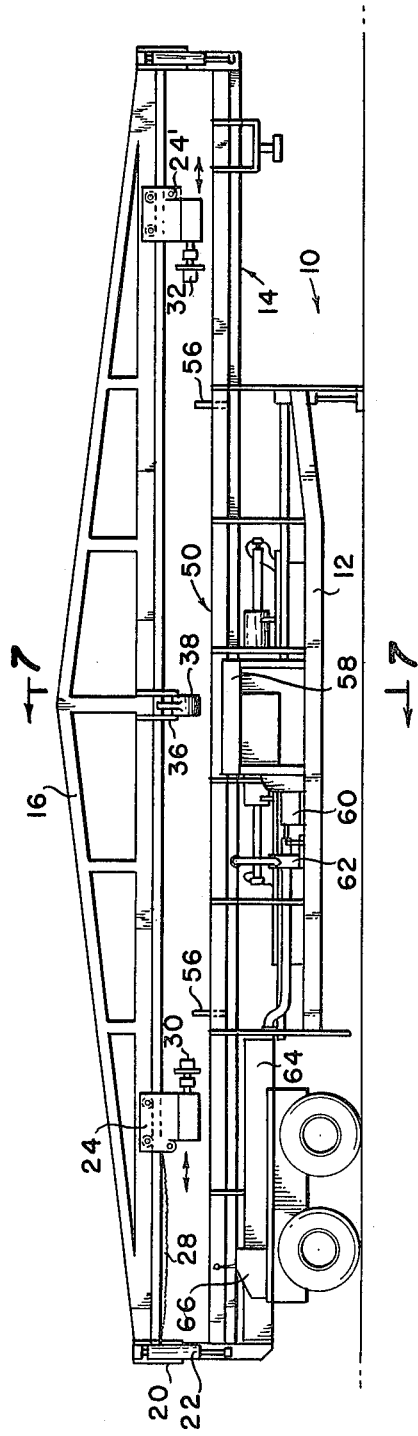

METHOD AND APPARATUS FOR LEAK TESTING THE INTERIOR OF PIPE

BACKGROUND OF THE INVENTION

Hydrostatically testing tubular goods, such as drill pipe and production pipe, has been carried out in the past as evidenced by the following patents:

| | |
|---|---|
| 1,101,932 | Leslie E. Hooker, et al |
| 1,851,345 | G. Brown, et al |
| 2,183,974 | C. A. Richardson |
| 2,986,029 | J. J. Musial |
| 3,350,920 | H. Brauer |
| 3,358,497 | E. D. Hauk |
| 3,371,521 | E. D. Hauk |
| 3,383,906 | C. E. Gillet |
| 3,460,376 | N. H. Kemp |
| 3,499,469 | B. Vizuete, et al |
| 3,877,293 | Roy A. McKeage |
| 4,067,228 | Ralph C. Elle, et al |
| 4,081,990 | John C. Chatagnier |

Leak testing the interior of pipe joints usually is carried out by utilizing water as the noncompressible testing medium because a considerable amount of liquid is used, and therefore, the employment of other noncompressible fluids represents a substantial cost of operation unless the noncompressible fluid can be recycled with very little waste. However, the cost of water is sometime considerable in some geographical areas of the world. This is especially so in the southwestern part of the United States, where water is often extremely difficult to obtain, as well as other less arid regions where a more convenient and abundant source of water represents a bothersome loss in time merely because of the necessity of continually replenishing the water. Moreover, regardless of the availability of water, the waste water represents a disposal problem. During inclement weather, the disposal water might freeze as it accumulates in the immediate test area, thereby producing a hazard to the workers. During fair weather, the waste water causes a messy muddy environment about the test area.

Various different means of rapidly filling the interior of a pipe to be tested have been proposed in the past, including float actuated check valves, remote controlled valves, and the like; however, in each of these instances visual observation of the water being emitted from the pipe is usually relied upon, thereby causing the water to contaminate the immediate area. Moreover, after the test has been completed, draining the water from the pipe interior is time consuming and messy.

Accordingly, it would be desirable to have made available a means by which a pipe can be completely filled with water, hydrostatically tested, and thereafter all of the water drained from the pipe and reused. It would be desirable if this could be carried out in a manner which eliminates contamination of the immediate environment with the waste water, and if the wasting of water could be completely eliminated. This is one of the subjects of the present invention.

SUMMARY OF THE INVENTION

Apparatus for hydrostatically testing pipe in order to determine the leak resisting characteristics thereof, comprising a main frame to which there is mounted an elongated upwardly opening water trough which has a length greater than the length of a pipe to be tested. A vertically movable pipe support apparatus is superimposed in mounted relationship above the trough and means are included by which the pipe support can be moved towards and away from the trough opening.

The pipe support includes spaced heads reciprocably carried thereon. The heads releasably engage the opposed ends of the pipe in sealed relationship therewith when the heads are reciprocated towards each other and along the longitudinal axial centerline of a pipe.

The apparatus includes means for transferring the pipe into and out of the trough, and means by which liquid can be drained from the interior of the tested pipe, back into the trough. A source of liquid pressure is provided for one of the heads to enable the pressure to be increased within the pipe.

A pipe to be tested is transferred into the trough where the pipe is submerged below the level of the liquid contained therewithin. The pipe is supported such that it is aligned with the spaced heads when the pipe support is lowered towards the trough. The pipe fills with trough liquid, and the heads moved towards one another and brought into sealed registry with the pipe ends. The filled pipe is elevated above the trough into the test position, while concurrently another pipe rolls into the trough and commences to be filled with liquid, while at the same time a previously tested pipe is positioned adjacent to the trough and is draining.

Fluid pressure is applied to the interior of the pipe at the test position and the interior thereof is isolated for a finite time interval while the internal pressure is observed, thereby determining the rate at which the internal pipe pressure decreases.

The tested pipe is then gravitated towards the drain position, while the pipe support descends into the trough, where it engages the previously filled pipe. The testing procedure continues in this manner until all of the pipe has been tested.

Accordingly, a primary object of the present invention is the provision of method and apparatus for determining the leak resisting characteristics of a pipe.

Another object of the present invention is the provision of method and apparatus for testing the structural integrity of a pipe by flowing a noncompressible fluid into the pipe interior, elevating the pressure of the liquid contained within the pipe for a time interval, and thereafter reusing noncompressible fluid in another pipe.

A further object of this invention is the provision of both method and apparatus for testing pipe by submerging the pipe within a noncompressible fluid, isolating the interior of the pipe and applying pressure to the interior of the pipe to determine the rate at which the isolated pressurized interior leaks.

A still further object of this invention is the provision of a pipe testing apparatus which automatically conveys pipe from a pipe receiving station into a water filled trough where the pipe is filled, engages the pipe ends with a seal means, leak tests the interior of the pipe, drains the pipe and reclaims the liquid from the interior thereof, and thereafter transports the pipe to a location remote from the trough.

These and various other objects and advantages of the invention will become readily apparent to those skilled in the art upon reading the following detailed description and claims and by referring to the accompanying drawings.

The above objects are attained in accordance with the present invention by the provision of method for use with apparatus fabricated in a manner substantially as described in the above abstract and summary.

BRIEF DESCRIPTION OF THE DRAWINGS

FIG. 5 is a top, plan view of the apparatus disclosed in FIG. 1;

FIG. 6 is a side, elevational view of the apparatus disclosed in FIG. 5;

DETAILED DESCRIPTION OF THE PREFERRED EMBODIMENT

Figure 1:
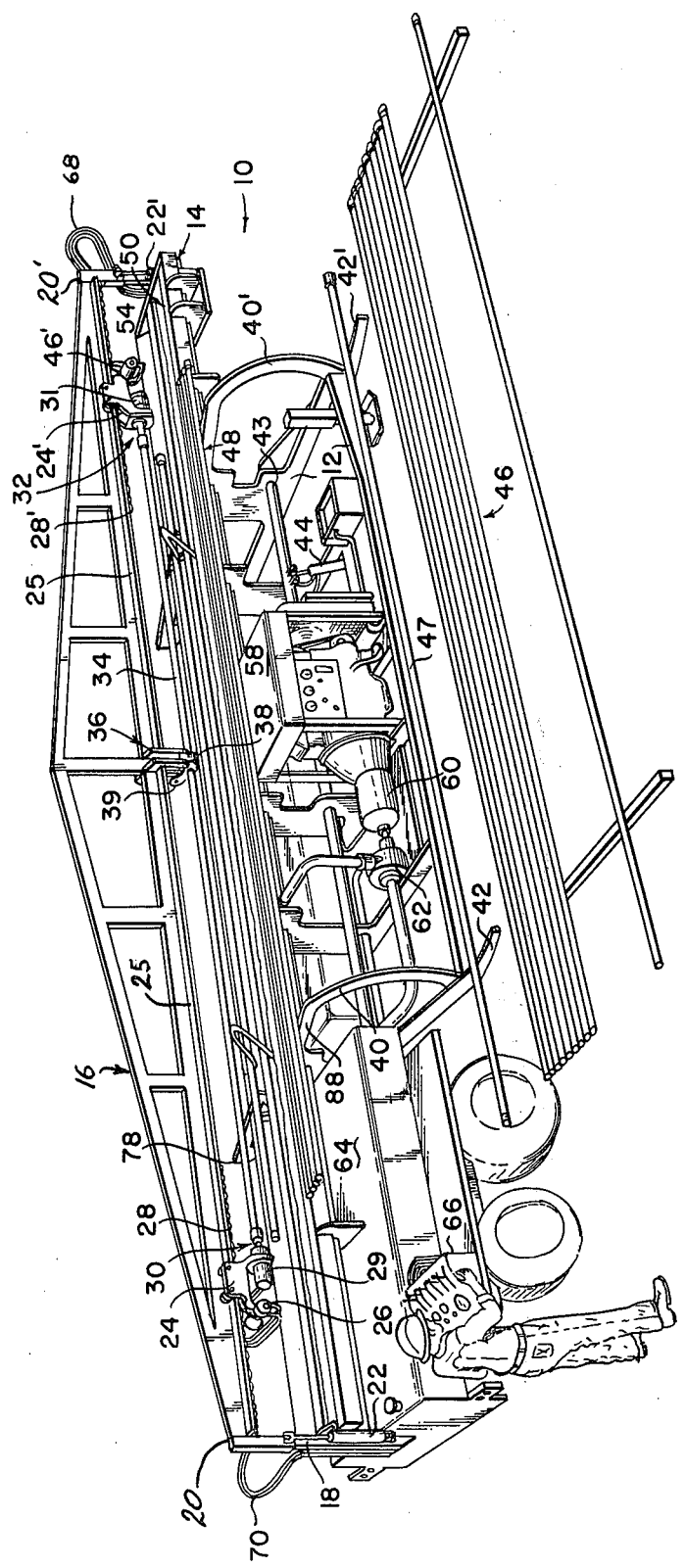
FIG. 1 is a perspective view of an automatic pipe testing apparatus made in accordance with the present invention.

In the figures of the drawings, there is disclosed a portable pipe testing apparatus 10 for hydrostatically pressure testing the interior of a pipe. As particularly seen disclosed in FIG. 1, together with some of the other figures of the drawings, the apparatus of the invention includes a main frame 12 which is ground supported by pneumatic tires at the left side of the drawing, which is also the end of the frame. A set of jacks are located at the other, or towed end, of the frame. The frame supports an elongated upwardly opening trough assembly 14 at an elevated position thereabove. An elongated pipe manipulator 16 is supported from the trough assembly and extends in superimposed relationship thereabove. The pipe manipulator is movable in a vertical plane by means of opposed supports, 18 and 20, located at each opposed end thereof. Hydraulic cylinders 22, 22' slidably move the telescoping supports 18 and 20, thereby changing the elevation of the pipe manipulator.

The pipe manipulator includes spaced carriages 24, 24' reciprocatingly mounted for movement towards and away from one another in supported relationship respective to the pipe manipulator. The carriages move on the illustrated rail 25. Each of the carriages are moved by means of a hydraulic motor 26 which engages a chain 28. The chain is attached to the pipe manipulator and is roved about a sprocket placed on the motor in a conventional manner.

Figure 9:
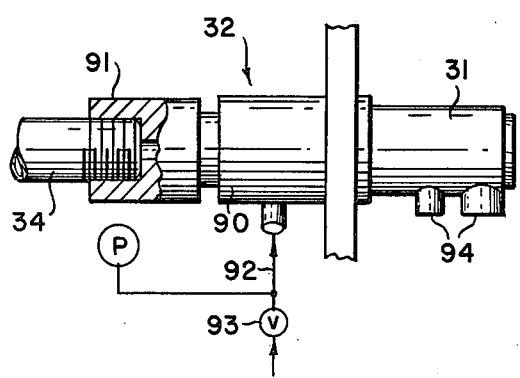

Hydraulic motor 29 imparts rotational motion into a head 30, while hydraulic motor 31 imparts rotational motion into an opposed head 32. The heads, 30 and 32, sealingly engage the opposed box and pin ends of the pipe. As seen in FIG. 9, one of the heads 32 includes a source of fluid pressure connected thereto so that when the heads engage the ends of the pipe, the interior of the pipe is isolated, and a source of pressure can be applied to the isolated interior of the pipe.

In FIG. 1, a pipe 34 is held within a pipe gripper device 36. In FIGS. 5 and 6, the pipe gripper has jaws 38 actuated by a hydraulic cylinder 39 which enables the gripper to releasably engage a marginal medial length of pipe, so that the pipe can be securely held as it is manipulated vertically respective to the trough.

Figure 7:
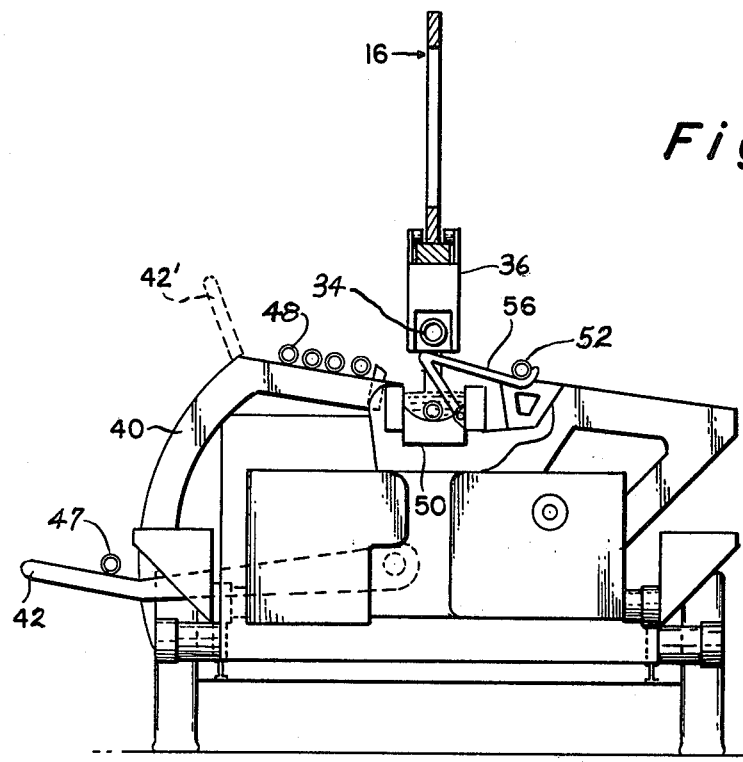
FIG. 7 is an enlarged, cross-sectional view taken along line 7—7 of FIG. 6.

In FIGS. 1 and 5-8, the trough assembly is seen to include the illustrated upper frame which is held in spaced relationship respective to the main frame by a number of spaced bulkheads, two of which are curved as noted by the numerals 40 and 40'. A pair of spaced loading arms 42, 42' are connected to the ends of a shaft 43, with the shaft 43 being journaled for axial rotation to the bulkheads. As seen in FIGS. 1 and 7, a hydraulically actuated cylinder assembly 44 rotates the shaft, thereby pivoting the arm 42 from the illustrated pipe receiving position into an elevated pipe discharging position at 42', so that a pipe joint at 46 to be tested can be moved from the illustrated pipe rack, into supported relationship on the arms at 47, whereupon the arms lift the pipe in a guided manner up along the curved bulkheads and into the illustrated position indicated by numeral 48. From 48 the pipe gravitates down the illustrated inclined supporting surface towards the water trough 50.

As seen in FIGS. 5-8, the trough preferably is an upwardly opening, elongated water containing vessel which extends a distance greater than the length of the pipe joint to be tested. The pipe 52 located on the side of the trough opposed to pipe 48 is arranged to drain into the drain basin 54 so that the used test water is returned to the filling trough. The trough assembly includes a pair of spaced pipe guides 56, the details of which will be discussed more fully later on in this disclosure.

In FIG. 1 of the drawings, an internal combustion motor 58 is connected to drive a hydraulic pump 60 and a water pump 62, thereby providing a source of high pressure, noncompressible fluid for connection to the isolated pipe interior, and a source of hydraulic power fluid for actuating the various hydraulic motors and cylinder assemblies. Storage tanks at 64 contain an ample supply of water and hydraulic fluid in separate compartments. Control apparatus at 66 remotely controls all of the motors, pumps, and moving machinery associated with the present invention. Hydraulic and water lines at 68 and 70 convey the appropriate fluid to and from the various components of the apparatus.

Figure 8:
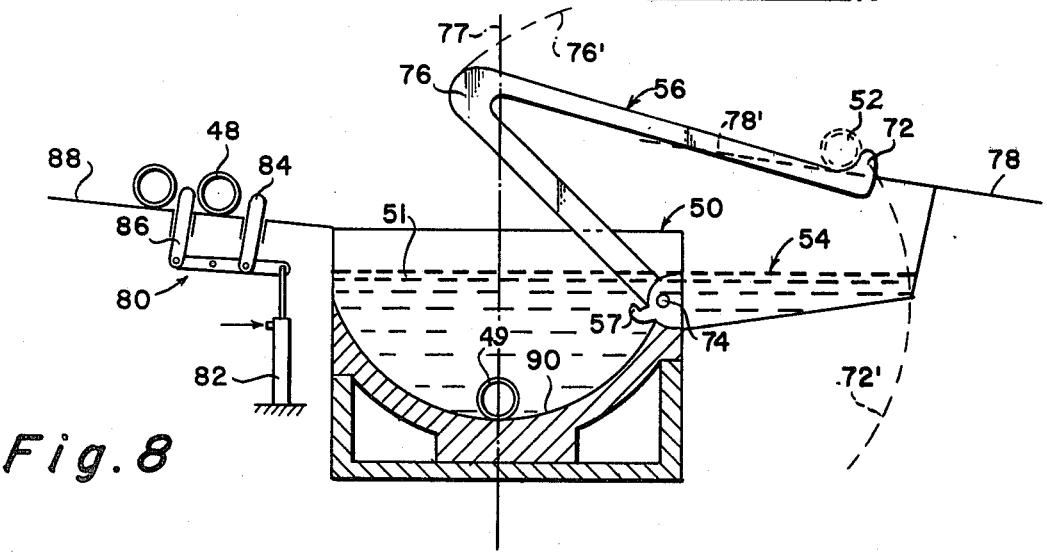
FIG. 8 is an enlarged, diagrammatical representation of part of the apparatus disclosed in FIG. 6; and, FIG. 9 is an enlarged, detail of part of the apparatus disclosed in FIG. 6.

As best seen illustrated in FIGS. 7 and 8, the pipe guide 56 includes a cradle 72 formed at the free end thereof, with the other end being pivoted to the interior of the trough by means of the illustrated ear and pivot pin 74. The pipe guide is formed into a V at apex 76. The marginal end portion adjacent to the apex overhangs the trough and extends beyond a vertical plane 77 within which the pipe 34 is moved by the pipe gripper apparatus, so that the pipe 34 encounters the marginal end formed at the apex, thereby pivoting the pipe guide as illustrated by the dot-dash lines 72' and 76'. This action releases the drained tested pipe from the cradle 72, whereupon the tested pipe gravitates along the inclined surface 78 in a direction away from the drain basin. The trough water overflows into the before mentioned supply tank 64.

As best seen in FIGS. 1, 7, and 8, the pipe joints which have been elevated into position 48 are sequentially fed into the trough by feed means 80. The feed means includes a hydraulically actuated cylinder 82 attached to the illustrated reciprocating stop means 84 and 86 so that when the piston retracts within the cylinder, stop 86 is extended while stop 84 is retracted, and vice versa, thereby permitting individual pipe joints to move down the inclined surface 88 into the trough, where the pipe comes to rest and fills with water at the location indicated by numeral 49.

In FIG. 9, one of the heads 32 includes a swivel 90 through which a hollow shaft connected to a pin coupling device 91 can conduct a source of pressurized fluid from conduit 92. Conduit 92 is connected to pump 62 and includes a remote control valve 93 so that when valve 93 is opened, fluid pressure flows through the swivel 90 and into the interior of pipe 34. The valve 93 is next closed and the pressure observed to determine the rate at which the pressure decreases within the isolated interior of the pipe. Hydraulic motor 31 is connected to rotate coupling device 91, and is provided with inlet and outlet conduits at 94 which are connected to the hydraulic pump 60 of FIG. 1 by means of the control console 66. The pipe preferably is elevated from 49 (FIG. 8) into position 34 (FIGS. 1 and 7) during testing.

Figure 2:
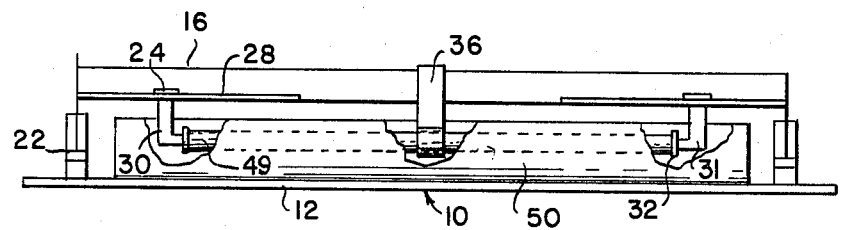
FIG. 2 is a reduced, side elevational view which schematically illustrates the apparatus of FIG. 1.
Figure 3:
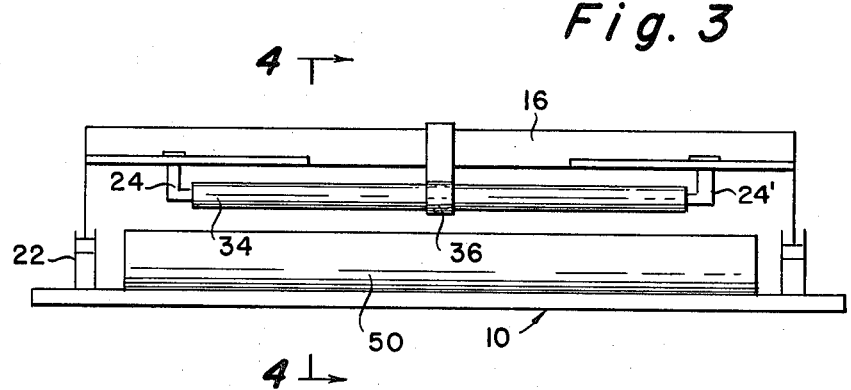
FIG. 3 is a schematical representation of the apparatus disclosed in FIG. 2, shown in another operative position.
Figure 4:
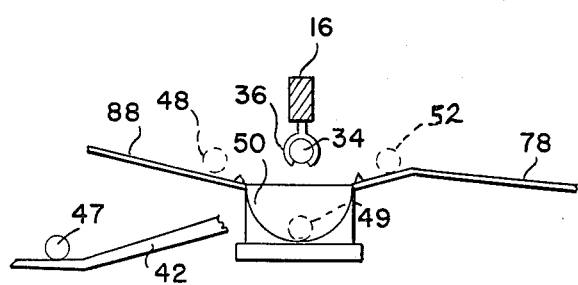
FIG. 4 is a schematical, cross-sectional view taken along line 4—4 of FIG. 3.

The operation of the apparatus is further illustrated in the schematical representation set forth in FIGS. 2-4, wherein the apparatus 10 for testing pipe is seen to comprise the frame 12 which supports an upwardly opening water trough 50. The trough has a length greater than the length of the pipe to be tested. The vertically movable pipe manipulator 16 is superimposed above the trough and movable toward and away from the trough opening.

Spaced heads 30 and 32 are mounted to the carriage means, which are reciprocatingly carried by the pipe manipulator. Means are provided by which the heads 30 may releasably engage the opposite ends of the pipe in sealed relationship therewith. Means 42 are included for transferring the pipe 47 into position 48, where the pipe then gravitates into the trough at 49, and fills with water. Means at 36 are included for transferring the pipe out of the trough where the pipe is tested at 34. The tested pipe then drains at 52 and is subsequently moved to a convenient storage, such as another pipe rack.

As more specifically illustrated in FIGS. 1 and 5-8, pipe at 46 is rolled onto arms 42, whereupon the pipe assumes position 47. Hydraulic cylinder 44 pivots the arms causing the pipe to be pivotally lifted until the pipe rolls down inclined support 88 into the position 48. The untested pipe stored at 48 is sequentially fed by apparatus 80 into the water trough 50, where the pipe is supported by the spaced members 90 and fills with water. The pipe manipulator is lowered into the upwardly opening trough until the opposed heads are aligned along the longitudinal axial centerline of the pipe. The jaws of the pipe gripper 36 are closed about the pipe and the carriages are moved by motors 26, while concurrently hydraulic motors 29 and 31 impart clockwise rotation into the heads 30 and 32 so that the heads sealingly engage the opposed pin and box ends of the pipe. The pipe manipulator is then moved vertically upwards by means of the spaced hydraulic cylinder assemblies 22 into the test position 34.

As the pipe moves in an upward direction, the pipe guide 56 dumps the drained pipe 52 onto the inclined surface 78. Pressure is next supplied to pipe 34 by opening valve 93 so that flow of noncompressible fluid enters the swivel and elevates the pressure of the fluid contained within the interior of pipe 34 to a predetermined pressure which is below the designed bursting strength of the pipe. The valve 93 is closed and the rate of the pressure drop observed at P (FIG. 9).

The hydraulic motors 29 and 31 are next turned counterclockwise, thereby releasing the pipe ends, and the carriages are moved away from the pipe ends. The pipe gripper is released, whereupon the pipe rolls down the pipe guide and into the cradle 72 where the water drains into the basin 54. During this time, apparatus 80 has released another pipe which rolls into position 49 and fills with water. The above manipulative steps may be synchronized respective to one another so that vertical movement of the pipe manipulator automatically controls the entire process.

As seen illustrated in FIG. 1, the operator at 66 can easily move the untested pipe 46 from the pipe rack unto the arms at 47 with little effort.

I claim:

1. Apparatus for hydrostatically testing pipe comprising a main frame, an upwardly opening water trough supported by said frame, said trough having a length greater than the length of a pipe to be tested;

a vertically movable pipe manipulator superimposed above said trough and movable towards and away from the trough opening;

spaced heads reciprocably carried by said pipe manipulator, means by which said heads releasably engage the opposite ends of a pipe in sealed relationship therewith;

a source of fluid pressure connected to one said head; means by which a pipe can be transferred into said trough and positioned below the liquid level of any water which may be contained therein so that the pipe is filled with fluid;

said pipe manipulator includes means for engaging and lifting a submerged pipe into a position above said trough;

means for transferring a pipe away from said pipe manipulator;

whereby pipe to be tested is submerged below the fluid level of any water contained within the trough, the pipe manipulator is lowered until the heads are aligned with the axial centerline of the pipe, whereupon the heads are moved towards one another and into sealed engagement with the pipe ends, the pipe can then be removed from the trough, fluid pressure can then be applied to the interior of the pipe to thereby test the leak characteristics of the pipe, and the heads are then removed from the pipe ends.

2. The apparatus of claim 1 wherein said pipe manipulator includes an elongated frame member, said heads include spaced carriage means attached for movement along opposed marginal ends of the elongated frame member;

said heads further include coupling means rotatably mounted to said carriage means; a rotating fluid conductor for one said head through which fluid pressure can be effected through the coupling means and within the interior of the pipe.

3. The apparatus of claim 2 wherein spaced cradles are mounted within said trough for supporting a pipe along the length thereof and below the surface of the water;

said means for engaging and lifting is a pipe clamp means supported on said frame member for releasably engaging a medial exterior surface of the pipe;

so that the frame member can be lowered to cause the clamp means to engage a medial length of the pipe, and the heads brought into alignment with the axial centerline of the pipe, and the heads then moved towards one another to engage the pipe ends while the pipe is submerged within the water.

4. The apparatus of claim 3 wherein said means for transferring a pipe into said trough includes a pair of spaced arms pivoted to said frame which laterally extend from said main frame to support a pipe thereon, and to lift the pipe above the trough, whereupon the pipe gravitates from the arms into the trough;

said clamp means thereafter elevates the pipe into a testing position above the trough and releases the tested pipe at a location above the trough so that the pipe gravitates away from the trough in an opposite direction to the spaced arms.

5. The apparatus of claim 1 wherein spaced cradles are mounted within said trough for supporting a pipe along the length thereof and below the surface of the water;

said frame member includes a pipe clamp means for releasably engaging a medial exterior surface of the pipe;

so that the frame member can be lowered towards the trough opening to bring the clamp means into engagement with a medial length of the pipe, and the heads are then brought into alignment with the axial centerline of the pipe, whereupon the heads may be moved towards one another to engage the pipe ends while the pipe is submerged within the water and in axial alignment with the heads.

6. The apparatus of claim 1 wherein said means for transferring a pipe into said trough includes a pair of spaced arms pivoted to said frame which laterally extend from said main frame to provide a pipe support, and which pivots to lift the pipe above the trough, whereupon the pipe gravitates from the arms and into the trough;

said means for engaging is a clamp means which engagingly clamps a medial pipe length and thereafter elevates the pipe to the test position and then releases the pipe at a location above the trough so that the tested pipe gravitates away from the trough.

7. Method of testing the leak resistant characteristics of a pipe comprising the steps of:
(1) filling a pipe joint to be tested with a noncompressible fluid by supporting the pipe within an elongated upwardly opening container of said noncompressible fluid;
(2) isolating the interior of the pipe by removably engaging the pipe ends with a seal member;
(3) applying pressure to said noncompressible fluid contained within the pipe by flowing a noncompressible fluid through one of said seal members;
(4) removing the pipe from the container, and then determining the rate of leakage of fluid from the interior of the pipe;
(5) releasing the internal pipe pressure, removing the seal member from the pipe ends;
(6) draining the fluid from the pipe interior, and accumulating and recycling said drained fluid.

8. The method of claim 7 and further including the step of isolating the interior of the pipe after carrying out step (3); and carrying out step (4) by measuring the internal pressure of the isolated pipe interior for a finite time interval to thereby determine the rate of pressure drop of the fluid contained within the pipe.

9. The method of claim 8 and further including the step of gravitating the pipe to be tested into the container and supporting the pipe in aligned relationship respective to the seal member so that the seal member can be spaced apart to enable reciprocal movement of the seal member along the axial centerline of the pipe to engage and release the pipe ends.

10. Method of testing the leak resistant characteristics of a pipe comprising the steps of:
(1) filling a pipe joint to be tested with a noncompressible fluid by supporting the pipe within an elongated upwardly opening container of said noncompressible fluid;
(2) isolating the interior of the pipe by removably engaging the pipe ends with a seal member;
(3) applying pressure to said noncompressible fluid contained within the pipe by flowing a noncompressible fluid through one of said seal members;
(4) removing the pipe from the container, and then determining the rate of leakage of fluid from the interior of the pipe;
(5) releasing the internal pipe pressure, removing the seal member from the pipe ends;
(6) draining the fluid from the pipe interior, and accumulating and recycling said drained fluid;
and further including the step of isolating the interior of the pipe after carrying out step (3); and carrying out step (4) by measuring the internal pressure of the isolated pipe interior for a finite time interval to thereby determine the rate of pressure drop of the fluid contained within the pipe;
and further including the step of gravitating the pipe to be tested into the container and supporting the pipe in aligned relationship respective to the seal member so that the seal member can be spaced apart to enable reciprocal movement of the seal member along the axial centerline of the pipe to engage and release the pipe ends.

11. The method of claim 10 and further including the step of removing the pipe from the container before carrying out step (5).

* * * * *